(No Model.) 3 Sheets—Sheet 1.

C. O. C. BILLBERG & P. A. N. WINAND.
ALTERNATING CURRENT MOTOR.

No. 444,934. Patented Jan. 20, 1891.

WITNESSES:
George Bannaran
John Revell

INVENTORS
Carl O. C. Billberg and
Paul A. N. Winand
BY
Howson and Howson
their ATTORNEYS (No Model.) 3 Sheets—Sheet 2.
C. O. C. BILLBERG & P. A. N. WINAND.
ALTERNATING CURRENT MOTOR.
No. 444,934. Patented Jan. 20, 1891.
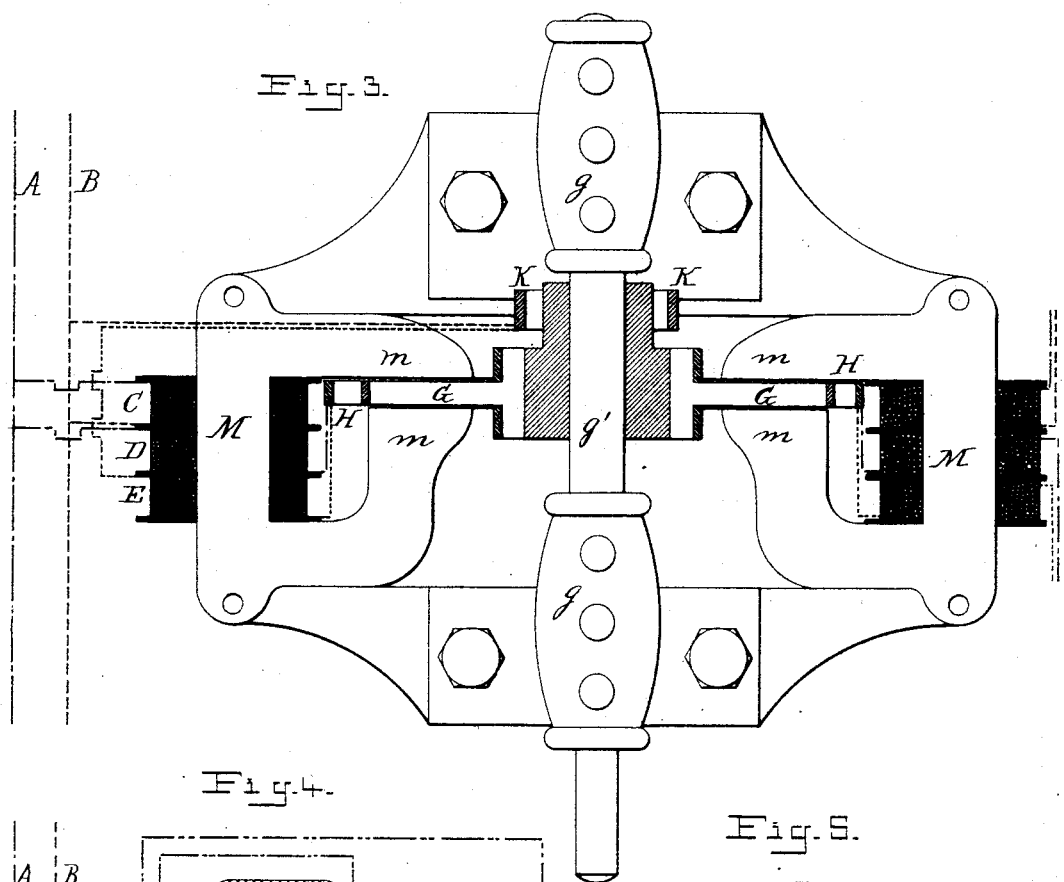
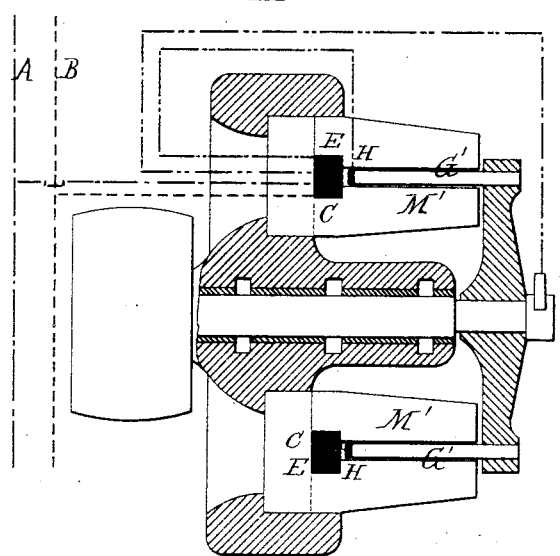
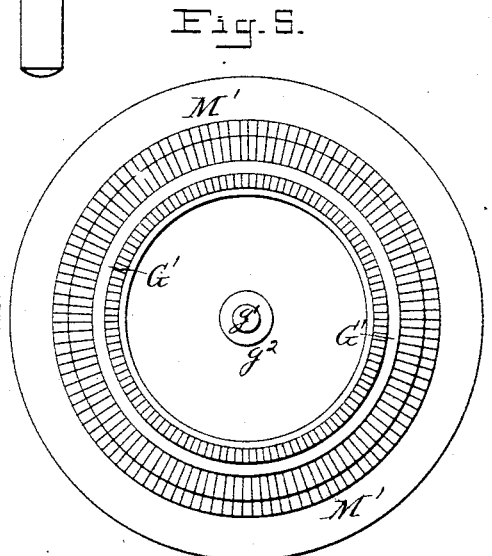
WITNESSES:
George Baumann
John Revell
INVENTORS
Carl O. C. Billberg and
Paul A. N. Winand
BY
Howson and Howson
their ATTORNEYS (No Model.) 3 Sheets—Sheet 3.

C. O. C. BILLBERG & P. A. N. WINAND.
ALTERNATING CURRENT MOTOR.

No. 444,934. Patented Jan. 20, 1891.

WITNESSES:
George Baumann
John Revell

INVENTORS
Carl O. C. Billberg and
Paul A. N. Winand
BY
Howson and Howson
their ATTORNEYS

UNITED STATES PATENT OFFICE.

CARL O. C. BILLBERG AND PAUL A. N. WINAND, OF PHILADELPHIA, PENNSYLVANIA.

ALTERNATING-CURRENT MOTOR.

SPECIFICATION forming part of Letters Patent No. 444,934, dated January 20, 1891.

Application filed June 10, 1890. Serial No. 354,965. (No model.)

*To all whom it may concern:*

Be it known that we, CARL O. C. BILLBERG, a subject of the King of Sweden, and PAUL A. N. WINAND, a subject of the King of Belgium, and both residents of Philadelphia, Pennsylvania, have invented an Improved Alternating-Current Motor, of which the following is a specification.

The object of our invention is to construct an alternating-current electric motor which will possess the same efficiency as a continuous-current motor, and this without the necessity of employing means for starting the motor to bring it to synchronism.

Our motor embodies some of the principles of an alternating-current transformer; but one of the main features of our invention is the construction of the motor with an armature in the form of a laminated Faraday disk or disks or cylinder or cylinders connected up in a circuit and rotating within a magnetic field whose polarity follows or accords with the alternations of the current supplied.

Figure 1:
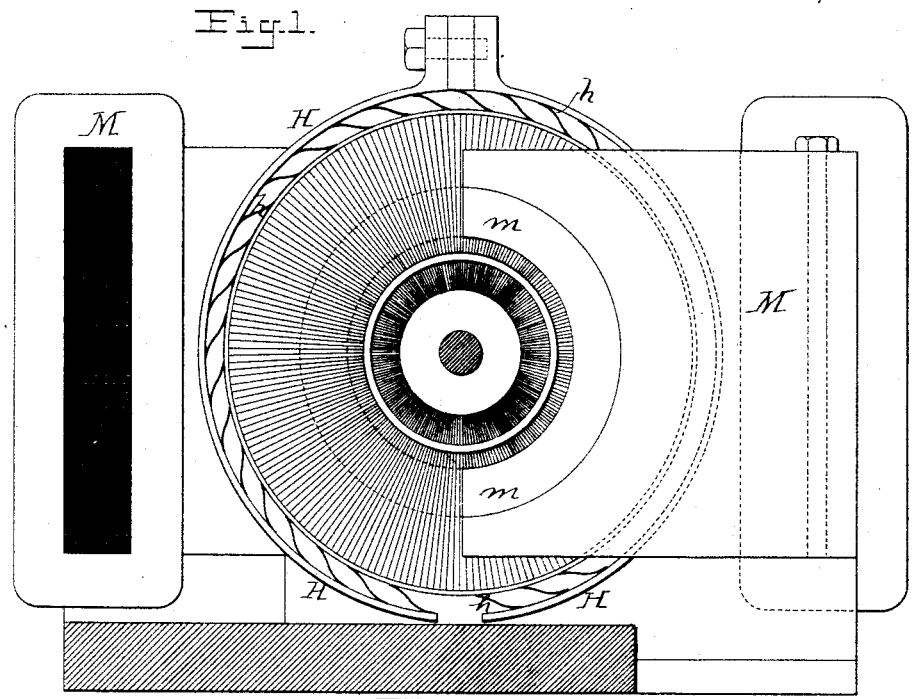
Figure 2:
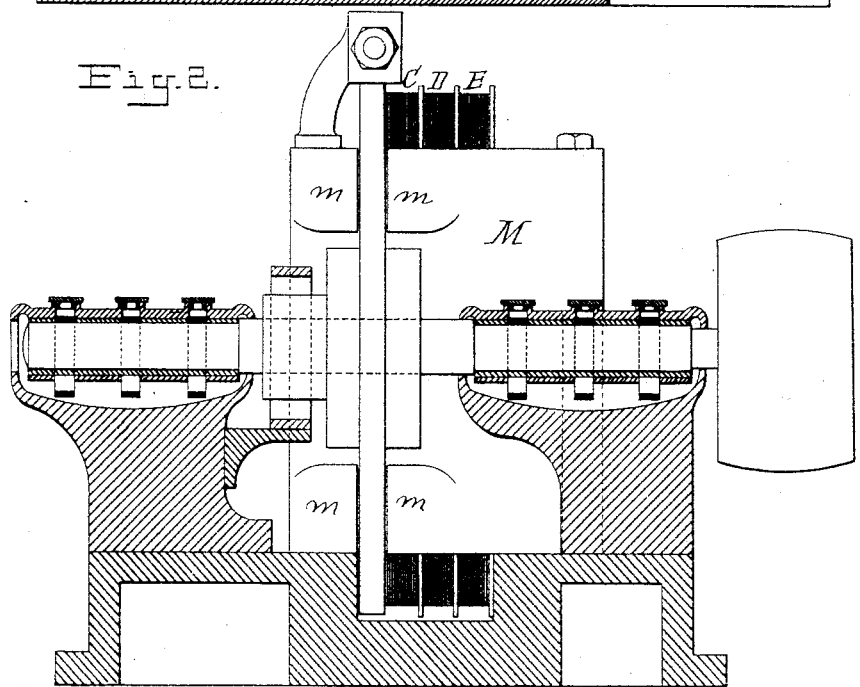
Figure 6:
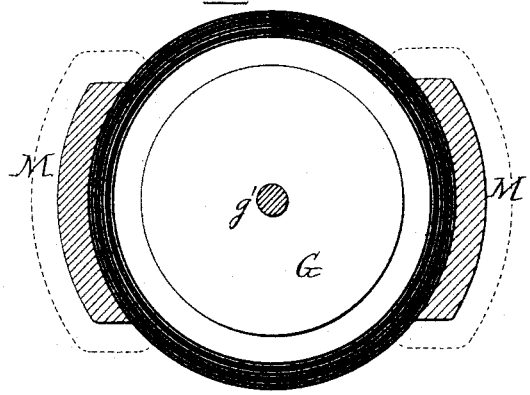
Figure 7:
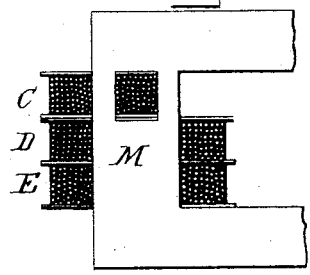
Figure 8:
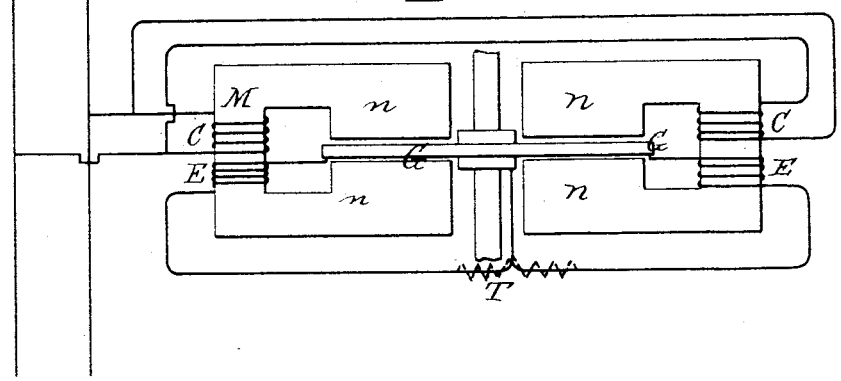

In the accompanying drawings, Figure 1 is an elevation, one-half in section, of one form of our improved motor. Fig. 2 is a vertical section at right angles to the view Fig. 1. Fig. 3 is a sectional plan view of the same. Figs. 4 and 5 are sectional and end views, respectively, illustrating a modification; and Figs. 6, 7, and 8 are diagrams of other modifications.

Referring to Figs. 1, 2, and 3, the electro-magnets M are built up of laminated iron and have wound on them one or more primary and one or more secondary coils, there being shown in the present instance three sets of coils C, D, and E, connected up as hereinafter described. The armature G is shown in this construction as in the form of a disk mounted on a shaft $g'$, adapted to rotate in suitable bearings or boxes $g$ on the base-plate or frame. This armature-disk is surrounded by the pole-pieces $m$ $m$ of the field-magnet on both sides and is laminated at right angles to the plane of rotation and parallel with the lines of magnetic force. With the field constructed as illustrated and with the armature in the form of a disk these laminations are radial—that is to say, the disk is built up of radiating bars or strips of iron or copper mounted on a central hub and with an inclosing ring at the periphery, as shown in Fig. 1. Collectors H and K are applied one to the periphery of the armature-disk and the other to the hub and connected up as hereinafter described, so that a current corresponding in its alternations and phases with the current in the field is passing through all the radial bars of the disk at the same time. Each collector consists of a ring either made in one piece or built up of a number of sections and carrying brushes $h$ to bear on the periphery of the disk or on the hub.

While we do not wish to restrict ourselves to one special manner of connecting up the collecting-brushes and the electro-magnetic coils, we prefer the arrangement illustrated more clearly in Fig. 3 in diagram. In this illustration A and B are the mains, to which an alternating current is supplied either directly from a generator or through the medium of a suitable transformer or transformers. The primary coils C of the electro-magnets are connected up in multiple or, if desired, in series to these leads. The terminals of the coils D are connected to one of the leads, as A, while the other terminals of these coils are connected to the collector H. The collector K is in turn connected to the other lead B. To the collector H are connected one set of terminals of the coils E, while the other terminals of these coils are connected to the collector K. Since the coils D and E are subjected to the lines of magnetic force produced by the current flowing through the coils C and D, like the secondary windings of the transformer, there will be produced in these coils D and E through the armature a current whose phase corresponds to the phase of the magnetism in the magnetic circuit M.

It is well known that the Faraday disk produces very small electro-motive force, which fact has heretofore prevented its being applied to general practical use; but according to our invention by properly proportioning the primary and secondary windings we can conveniently produce large currents of such electro-motive force as may be needed, so that this form of armature may be used with advantage. It should be understood, however, that while the disk form of armature is preferable, we do not wish to limit ourselves thereto; for it may have any equivalent form, such as a cylinder or cylinders, provided proper lamination is used, as shown, for instance, in Figs. 4 and 5. In this case the laminated armature G' is a cylinder, which is hollow and built up of bars or strips carried by a wheel or hub $g^2$ on a central shaft or axis $g'$, which turns in bearings in the frame. The laminated field M' is also cylindrical or annular and is built up of plates mounted in the frames to surround the hollow cylindrical armature G' both inside and out. The coils—two sets C and E—are embedded within the iron of the laminated field. One collector K bears on a ring at the hub, while the other collector H bears on the ends of the bars of the hollow cylinder or upon a ring carried thereby, and the conductor from this collector H may pass out between the plates of which the field-core is built up. Although we have particularly shown and described the detailed construction of this form of motor with a laminated armature in the form of a hollow cylinder, it is proposed to make this construction the subject of a separate application for a patent, and we therefore do not here claim the detailed construction.

When either the disk or cylindrical form of armature is used the material may be copper, iron, or other suitable conducting substance. If found preferable, the disk or cylinder may be stationary and the field-magnets rotate, instead of the opposite arrangement, which has been described. The magnetic circuit of the motor has been shown in Figs. 1, 2, and 3 as divided into two parts; but this can be changed to suit practical requirements. The coils, instead of surrounding the iron core of the field-magnets, may be surrounded by the iron, as shown in Fig. 4, and they may themselves concentrically inclose the armature, as indicated, for instance, in the diagram Fig. 6. It may be preferable in some cases to divide the magnetic circuit M into two or more branches $n$ $n$, as indicated in Fig. 7, coils being wound around these parts or branches $n\, n$. The proportions of the several coils of the electro-magnets will vary in different cases, and will depend upon the required condition of the magnetic circuit, upon the amount of self-induction of the disk, the starting torque, the speed, and the regulation required. In some cases one or more of these coils may be dispensed with. For instance, in the construction Figs. 4 and 8 we have shown the electro-magnets of the motor as provided with only two sets of coils—one, the primary, with terminals connected in multiple to the leads, and the other coils, the secondary, with their terminals connected to the collector of the armature. Under some circumstances it may be desirable to insert in some of the circuits a transformer with either a closed or open magnetic circuit or an induction-coil, or a simple choking-coil, as indicated by the dotted line at T in Fig. 8.

We claim as our invention—

1. An alternating-current motor having an armature in the form of a laminated Faraday disk or cylinder and electro-magnets to act thereon, having one or more primary and one or more secondary windings, the armature being connected in the secondary circuit, all substantially as described.

2. An alternating-current motor having an armature in the form of a laminated Faraday disk or cylinder, with electro-magnets to act thereon, having one or more primary and one or more secondary coils, mains supplying alternating current to the primary windings, and collectors for the armature connected up with the secondary windings, all substantially as set forth.

3. An alternating-current motor having an armature in the form of a laminated Faraday disk, collectors at the hub and periphery of the disk, and electro-magnets to act on the said disk and having one or more primary and one or more secondary coils, the secondary coils being connected up to the collectors, substantially as set forth.

4. An alternating-current motor having an armature in the form of a laminated Faraday disk or cylinder, and collectors for the armature, each collector consisting of a ring or sections of rings, with brushes connecting all parts of the disk in circuit at the same time, and electro-magnets to act on the disk and having primary and secondary windings, the primary windings being connected to the leads and the secondary windings to the collectors, substantially as set forth.

5. An alternating-current motor having an armature in the form of a laminated Faraday disk or cylinder and electro-magnets acting thereon and having three sets of coils, one set connected up to the leads, another set connected up in circuit through the armature, and the third set connected to the leads and the armature, substantially as described.

In testimony whereof we have signed our names to this specification in the presence of two subscribing witnesses.

CARL O. C. BILLBERG.
PAUL A. N. WINAND.

Witnesses:
HARRY SMITH,
HUBERT HOWSON.